3,522,284
PRODUCTION FOR HALOGENATED PHENOXYSILANES

Hans-Joachim Kötzsch, Troisdorf, Germany, assignor to Dynamit Nobel Aktiengesellschaft, Troisdorf, Bezirk Cologne, Germany
No Drawing. Filed Feb. 9, 1967, Ser. No. 614,801
Claims priority, application Germany, Feb. 10, 1966, D 49,327
Int. Cl. C07f 7/06, 7/18
U.S. Cl. 260—448.8    11 Claims

ABSTRACT OF THE DISCLOSURE

Reaction of a halophenol with a halosilane having one hydrogen substituent on the silicon atom in the presence of a tertiary amine or a tertiary amine salt to produce a halophenoxy-silane.

---

This invention relates to halogenated phenoxysilanes. It more particularly refers to a novel method of preparing such compounds.

This specification describes the reaction of halosilanes with halophenols in the presence of tertiary amines, such as N,N-dimethyl aniline, or hydrochlorides of such which have a hydrogenchloride vapor pressure which is less than the reaction pressure.

Various general processes are known for the production of phenoxy silanes. It is known to transesterify various alkoxy silanes, e.g. ethoxysilane, with suitable phenols in the presence of strong acid or basic catalysts, e.g. p-toluenesulfonic acid. Unfortunately, this transesterification process is not efficiently operative where halogenated phenols are used.

It has been found that when such alkoxysilanes are reacted in the fused state or in solution with such halogenated phenols with or without known catalysts, the expected reaction proceeds very slowly in the initial reaction stages and ceases before any significant quantities of phenoxysilanes have developed.

Since it is known that halosilanes and non-halo-substituted phenols will react in this manner, attempts have been made to produce the desired products by direct hydrogen chloride condensation of halosilanes and halophenols. However, with halogenated phenols this reaction proceeds very slowly and not at all in a satisfactory manner. The use of amines, such as pyridine, has been attempted in order to increase this rate of reaction on the theory that pyridine is an acid acceptor and also on the theory that pyridine forms Lewis acid complexes with the silane. It has been found, however, that even though non-halo-substituted phenols react quite readily under these circumstances, halogenated phenols do not, even if the pyridine is used in stoichiometric or excess proportions. The pyridine forms ammonium salts which are not capable of reacting with halophenols to form halophenoxysilanes.

According to J. Org. Chemistry 25 (1960), pp. 1645–1648, an attempt has been made to manufacture halogenated phenoxysilanes, such as halotetraphenoxysilane, by reacting the corresponding sodium phenolates with halogensilanes in xylene. In this manner it became possible for the first time to manufacture the phenoxysilanes of pentachlorophenol and 2,4,6-trichlorophenol in yields of about 60%. The disadvantages of this process, in addition to the low yield, are also the unavoidable use of metallic sodium in order to obtain the sodium phenolates in the required high degree of purity, and the production of large amounts of by-products including inorganic salts, thereby making it difficult to separate the pure halogenated phenoxysilanes, particularly on account of their poor solubility and the tendency to hydrolysis. Consequently, this process is not suitable for industrial manufacture.

It is therefor an object of this invention to provide an improved process for the production of halophenoxysilanes.

It is another object of this invention to provide a novel catalyst for the reaction of halosilanes and halophenols.

Other and additional objects of this invention will become apparent from a consideration of this entire specification including the claims appended hereto.

In accord with and fulfilling these objects, one aspect of this invention includes the reaction of a phenol of the formula:

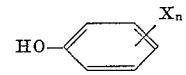

wherein X is at least one halogen selected from the group consisting of fluorine, chlorine and bromine; and $n$ is an integer of 1 to 5;

with a silane of the formula:

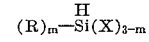

wherein R is at least one member selected from the group consisting of hydrogen, alkyl, cycloalkyl, aryl, alkoxy and aryloxy; and $m$ is 0 to 1;

to produce a halophenoxysilane of the formula:

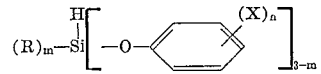

wherein R, X, $m$ and $n$ have the same meanings assigned above.

The reaction is carried out in the liquid phase as either a fused reaction mass or in solution in the presence of a tertiary amine or a tertiary amine hydrochloride having a hydrogen chloride vapor pressure under the conditions of reaction which is less than the reaction pressure.

The reaction is suitably carried out at a temperature of about 0 to 150° C., preferably about 10 to 125° C. Where the reaction is carried out in solution, suitable solvents include ethers and hydrocarbons. The reaction pressure may be up to about 12 atmospheres gauge, preferably at ambient, e.g. zero, gauge pressure.

Suitable solvents in the meaning of the present invention are both aliphatic and aromatic hydrocarbons as well as simple and cyclic ethers. Examples of aliphatic hydrocarbons are both single compounds and mixtures thereof, such isooctane and benzene fractions, as for example those having a boiling range from 120 to 180° C. Benzene, toluene and xylene are examples of suitable hydrocarbons. Examples of ethers suitable for the performance of the reaction would be diisopropyl ether, diisoamyl ether, diphenyl ether, 1,4-dioxane and others. This enumeration of suitable ethers shows that both aliphatic and aromatic open-chain ethers can be used.

Suitable reactants for the performance of the process of the invention are halogenated phenols of the previously mentioned formula. Suitable phenols are, for example, the fluorinated phenols, such as 4-fluorophenol and pentafluorophenol, the chlorinated phenols, such as 2-, 3- and 4-chlorophenol, 2,3-, 2,4-, 2,5-, 2,6-, 3,4- and 3,5-dichlorophenol, 2,3,5- 2,4,5- and 2,4,6-trichlorophenol and 2,3,4,6-tetrachlorophenol, as well as pentachlorophenol, and the brominated phenols such as 2-, 3- and 4-bromophenol, 2,4- and 2,6-dibromophenol, 2,4,6-tribromophenol and pentabromophenol. Needless to say, mixtures of the aforementioned halogenated phenols with one another and also with other hydroxy compounds (alcohols or halogen-free phenolic compounds) can be used according to the invention for the manufacture of the phenoxysilanes.

In the above general formuli, R has been characterized as being alkyl, aryl, alkoxy, aryloxy or hydrogen. The following are exemplary of these substituents:

A straight or branched alkyl radical (e.g., methyl, ethyl, i-propyl, n-propyl, n-dodecyl, n-octadecyl etc.), cycloalkyl radical (such as cyclopentyl, cyclohexyl etc.) or aryl radical (such as phenyl, naphthyl etc.), as well as an alkoxy radical (e.g. benzyloxy etc.) and an aryloxy radical that may be alkyl-substituted if desired (e.g., phenoxy, α- and β-naphthoxy and p-tert-butylphenoxy and the like), X represents fluorine, chlorine or bromine, and $m=0$ or 1.

Typical representatives of the aforementioned classes of substances are, for example: dichlorosilane, trichlorosilane, methyldichlorosilane, and the like.

Halogen silanes and halogenated phenols are used for the manufacture of halogenated phenoxysilanes, preferably in the stoichiometric ratio, i.e., one mole of halogenated phenol is used per mole of halogen of the silane. The halogenated phenoxysilane yields can be improved by using an excess of phenolic compound.

Homogeneous and mixed tertiary amines having aliphatic, cycloaliphatic and aromatic substituents or mixtures thereof, i.e., those whose amino group is not a component of an aromatic ring system, are suitable for the performance of the process of the invention. The hydrochloride vapor pressure of the mono- or dihydrochlorides at the reaction temperature has proven to be a criterion of the suitability of a tertiary amine; that is, the HCl vapor pressure of the mono- or dihydrochloride must be lower than the reaction pressure. At normal pressure, therefor, those amines are used whose HCl tension in the temperature range of the process is lower than 760 mm. Hg. At normal pressure those amines are preferred whose HCl partial pressures at 0 to 150° C. range from 80 to 700 mm. Hg, i.e., the mono- or dihydrochlorides of the tertiary amines that are usable according to the invention must be thermally instable in the reaction range, and yet they must be in a formation decomposition equilibrium.

Tertiary amines which are useful in this invention correspond to the general formula:

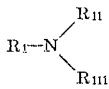

wherein none of the R groups are bound together in an N containing aryl ring system.

Suitable tertiary amines having aliphatic radicals are, for example: trimethylamine, triethylamine, triisopropylamine, triisobutylamine, monoethyldiisopropylamine, monoethyl-di-n-butylamine, tri-n-butylamine, N,N,N',N'-tetramethylbutanediamine-(1,4), N,N,N',N' - tetramethylethylenediamine, as well as substituted tertiary aliphatic amines such as N-(3-chloropropyl)-diisopropylamine, tris-(2-ethoxyethyl)-amine, N,N - di-(n-butyl)-aminoacetonitrile, N,N-di-(isopropyl)-aminoacetonitrile, N-(n-butyl)-N-(methyl)-aminoacetonitrile, etc. Dimethylcyclohexylamine is an example of an amine having cycloaliphatic radicals. Lastly, there are the suitable amines haivng aromatic radicals, such as N,N-dialkylaniline, N,N-di-methylaniline and N,N-diethylaniline etc., p-bromophenyldimethylamine, 2,4 - dichlorophenyldiethylamine, 4-nitrophenyldi-n-butylamine, 2,4-dinitrophenyldimethylamine, benzyldimethylamine and N,N,N',N'-tetramethylbenzidine. Also suitable are heterocyclic, tertiary amines, such as N-butylmorpholine, N-phenylmorpholine, N-(p-methylphenyl)-morpoline, morpholinoacetic acid morpholide, N,N'-dialkylpiperazine or N,N'-diarylpiperazine, N-substituted piperidine derivatives, N-aryl-N-alkyltetrahydroquinoline, N,N'-dimethylpiperazine, N,N'-di-n-butylpiperazine, N,N' - diphenylpiperazine, N-alkyl- and N-aryl-pyrrolidine and their dervatives, N-methylpyrrolidine, N-n-butylpyrrolidine, N-phenylpyrrolidine and substituted derivatives, N-n-propyl-tetrahydroquinoline, N-phenyltetrahydroisoquinoline, and N-phenylbenzimidazole, N-n-butylbenzimidazole and the like. The last-named aliphatic-aromatic amines are especially suitable for the performance of the process under normal pressure.

The tertiary amines or hydrochlorides thereof that serve as the catalysts are used in quantities of 0.1 to 20 moles, and preferably 0.1 to 2 moles, per hundred moles of halogen silane.

Under the conditions according to the invention, the condensation takes place rapidly, with the segregation of stoichiometric amounts of gaseous hydrogen chloride. In this manner, easily isolatable halogenated phenoxysilanes develop in good yields and in high purity.

The halogenated phenoxysilanes manufactured according to the above-described process can be used as plastic additives, water-repellentizers, textile adjuvants, parting agents, dressings for glass fiber fabrics, and as surface treating agents on the basis of their fire-retardant, fungicidal, phytotoxic, bactericidal and, to some extent, insecticidal properties.

The following examples are illustrative of the practice of this invention without in any way being limiting thereon.

EXAMPLE 1

1 mole of pentachlorophenol was dissolved in 800 ml. of toluene and dried by distillation on a water separator. In a two-liter flask equipped with an agitator and a reflux condenser (−80° C.), 0.5 ml. of N,N-dimethylaniline was added to this solution under nitrogen, and at 20° C. 0.33 mole of trichlorosilane was added. The mixture was stirred for about one hour at 20–30° C., whereupon 1 mole of HCl evolved. Then the temperature was raised within 2 hours to 110° C., and the reaction terminated in one hour of refluxing, the reflux condenser being changed over to water cooling. The hydrogen chloride that came out was absorbed in 2 N caustic soda solution for control purposes. Then the solution was suction filtered and concentrated to 400 ml. Upon cooling, an already very pure tris-(pentachlorophenoxy)-silane settled out as a finely crystalline, heavy precipitate. The yield amounted to 89%. After recrystallization from carbon tetrachloride, the product has a decomposition point of 152° C.

*Analysis.*—Calculated for $(C_{18}HCl_{15}O_3Si)$ (percent): C, 26.18; Cl, 64.47; Si, 3.40. Found (percent): C, 25.96; Cl, 64.40; Si, 3.68.

Zerewitinoff determination with N/10 ethanolic caustic potash solution showed 0.11% H (calculated 0.12% H).

EXAMPLE 2

In the same manner as in Example 1, 0.5 mole of methyldichlorosilane was used to produce methyl-bis-(pentachlorophenoxy)-silane in a 90% yield; the decomposition point of this substance after recrystallization from cyclohexane was 160° C.

Zerewitinoff determination (N/10 ethanolic KOH) showed 0.14% H (0.18% H calculated).

EXAMPLE 3

In the same manner as in Example 1, 0.1 mole of pentafluorophenol was reacted in 6 hours with 0.033 mole of trichlorosilane in 80 ml. of benzene, in the presence of 0.2 ml. of N,N-dimethylaniline. Then the benzene was evaporated away and the crude product remaining in the evaporation concentrate was distilled at 1 torr. The tris-(pentafluorophenoxy)-silane (M.P. 54° C., B.P.$_1$ 117–199° C.) developed in a yield of 79%.

Zerewitinoff determination (N/10 ethanolic KOH) showed 0.15% H (0.17% H calculated).

EXAMPLE 4

In the same manner as in Example 1, 1 mole of 2,4,6-tribromophenol was reacted, and, after the concentration to 400 ml., the tris-(2,4,6-tribromophenoxy)-silane was brought to crystallization with pentane. The yield amounted to 81%. After recrystallization from carbon tetrachloride, the product fused at 159° C. with decomposition.

Zerewitinoff determination (N/10 ethanolic KOH) showed 0.062% H (0.08% H calculated).

Calculated (percent): C, 21.26; H, 0.70; Br, 70.68; Si, 2.76. Found (percent): C, 21.51; H, 1.02; Br, 71.01; Si, 2.92.

EXAMPLE 5

In the same manner as in Example 1, 0.1 mol of pentabromophenol was reacted with 0.033 mole of trichlorosilane in 8 hours. After the concentration of the solution, the tris-(pentabromophenoxy)-silane precipitated as a finely crystalline, heavy precipitate. The yield amounted to 88%. After recrystallization from toluene, the product has a decomposition point of 170° C.

*Analysis.*—Calculated for ($C_{18}HBr_{15}O_3Si$) (percent): C, 14.50; Br, 80.36; Si, 1.88. Found (percent): C, 14.74; Br, 79.98; Si, 2.02.

The catalysts of this invention can be characterized as acyclic or alicyclic tertiary nitrogen compounds. Thus the tertiary nitrogen constituent is not itself part of an aromatic (e.g. pyridine type) ring system although aromatic substituents such as phenyl may be present pendant from said nitrogen.

What is claimed is:

1. In the process of producing a halophenoxy-silane by the reaction of a halosilane of the formula:

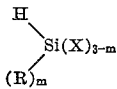

with a halophenol of the formula

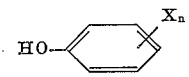

to produce a product of the formula:

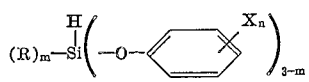

wherein R is at least one member selected from the group consisting of hydrogen, alkyl, cycloalkyl, aryl, aryloxy and alkoxy; X is at least one halogen selected from the group consisting of fluorine, chlorine and bromine; $n$ is an integer of 1 to 5; and $m$ is 0 to 1; the improvement which comprises carrying out said reaction in the liquid phase in the presence of about 0.1 to 20 moles per 100 moles of silane reactant of at least one catalyst selected from the group consisting of an acyclic tertiary-amine, an alicyclic tertiary-amine, an aromatic tertiary-amine, a heterocyclic tertiary-amine, whose amino group is not a component of an aromatic ring system, and hydrochloride salts thereof having a vapor pressure lower than the reaction pressure.

2. The improved process claimed in claim 1, wherein said R is at least one member selected from the group consisting of: hydrogen, methyl, ethyl, i-propyl, n-propyl, n-dodecyl, n-octadecyl, cyclopentyl, cyclohexyl, phenyl, naphthyl, benzyloxy, phenoxy, α- and β-naphthoxy and p-tert-butylphenoxy.

3. The improved process claimed in claim 1, carried out in the fused state.

4. The improved process claimed in claim 1, carried out in a solution.

5. The improved process claimed in claim 4, wherein the solvent is at least one member selected from the group consisting of: isooctane, benzene, toluene, xylene, diisopropyl ether, diisoamyl ether, diphenyl ether and 1,4-dioxane.

6. The improved process claimed in claim 1, carried out at a temperature of about 0 to 150° C. and a pressure up to about 12 atmospheres gauge.

7. The improved process claimed in claim 1, wherein said reaction is carried out at a temperature of 10 to 125° C. and at a pressure of about 0 atmosphere gauge.

8. The improved process claimed in claim 1, wherein said phenol is at least one member selected from the group consisting of: 4-fluorophenol, pentafluorophenol, 4-chlorophenol, 2,4,6-trichlorophenol, 2,3,4,6 - tetrachlorophenol, pentachlorophenol, 2 - bromophenol, 3-bromophenol, 4-bromophenol, 2,4-dibromophenol, 2,6-dibromophenol, 2,4,6-tribromophenol and pentabromophenol.

9. The improved process claimed in claim 1, wherein said silane is at least one member selected from the group consisting of: dichlorosilane, trichlorosilane, and methylchlorosilane.

10. The improved process claimed in claim 1, wherein said amine is at least one member selected from the group consisting of: triisobutylamine, monoethyldiisopropylamine, monoethyl-di-n-butylamine, tri - n - butylamine, N,N,N',N'-tetramethylbutanediamine - (1,4), N,N,N',N'-tetramethylethylenediamine, N-(3 - chloropropyl)-diisopropylamine, tris - (2 - ethoxyethyl)-amine, N,N-di-(n-butyl) - aminoacetonitrile, N,N - di-(isopropyl)-aminoacetonitrile, N-(n-butyl)-N-(methyl)-aminoacetonitrile, dimethyldicyclohexyl-amine N,N-dialkylaniline, N,N - dimethylaniline, N,N - diethylaniline, p - bromophenyldimethylamine, 2,4-dichlorophenyldiethylamine, 4 - nitrophenyldi-n-butylamine, 2,4 - dinitrophenyldimethylamine, benzyldimethylamine, N,N,N',N'-tetramethylbenzidine, N-butylmorpholine, N-phenylmorpholine, N - (p - methylphenyl)-morpholine, morpholinoacetic acid morpholide, N,N'-diarylpiperazine, N-aryl-N-alkyltetrahydroquinoline, N,N' - dimethylpiperazine, N,N' - di-n-butylpiperazine, N,N'-diphenylpiperazine, N-methylpyrrolidine, N-n-butylpyrrolidine, N-phenylpyrrolidine, N-n-propyl-tetrahydroquinoline, N-phenyltetrahydroisoquinoline, N-phenylbenzimidazole and N-n-butylbenzimidazole.

11. The improved process claimed in claim 1, wherein said proportion is about 0.1 to 2 moles of tertiary amines per 100 moles of silane reactant.

References Cited

UNITED STATES PATENTS

| | | | |
|---|---|---|---|
| 3,029,269 | 4/1962 | Abbott et al. | 260—448.8 |
| 3,271,360 | 9/1966 | Williams | 260—448.8 X |
| 3,287,291 | 11/1966 | Ender | 260—448.8 X |
| 3,310,578 | 3/1967 | Bluestein | 260—448.8 |

OTHER REFERENCES

Speier, J.A.C.S., 76, pps. 1003–10, Feb. 20, 1952.

TOBIAS E. LEVOW, Primary Examiner

P. F. SHAVER, Assistant Examiner

U.S. Cl. X.R.

106—13, 15; 117—124; 252—8.6

PO-1050
(5/69)

UNITED STATES PATENT OFFICE
CERTIFICATE OF CORRECTION

Patent No. 3522284    Dated July 28, 1970

Inventor(s) Hans-Joachim Kotzsch

It is certified that error appears in the above-identified patent and that said Letters Patent are hereby corrected as shown below:

Column 6, line 20   (Spec. claim 8, line 5)

change "3-bromophenol" to --2-bromophenol--

Column 6, line 21   (Spec. Claim 8, line 6)

change "4-bromophenol" to --3-bromophenol--

SIGNED AND
SEALED
DEC 15 1970

(SEAL)
Attest:

Edward M. Fletcher, Jr.
Attesting Officer

WILLIAM E. SCHUYLER, JR.
Commissioner of Patents